United States Patent [19]
Kuo

[11] Patent Number: 4,720,418
[45] Date of Patent: Jan. 19, 1988

[54] PRE-REACTED RESISTOR PAINT, AND RESISTORS MADE THEREFROM

[75] Inventor: Charles C. Y. Kuo, Elkhart, Ind.

[73] Assignee: CTS Corporation, Elkhart, Ind.

[21] Appl. No.: 750,029

[22] Filed: Jul. 1, 1985

[51] Int. Cl.[4] ............................................. B05D 5/12
[52] U.S. Cl. .................................. 428/209; 428/210; 428/901; 428/328; 252/518
[58] Field of Search ............. 428/432, 404, 328, 209, 428/210, 901; 252/518

[56] References Cited

U.S. PATENT DOCUMENTS

| | | | |
|---|---|---|---|
| 3,598,761 | 8/1971 | Woulbroun et al. | 252/514 |
| 3,776,772 | 12/1973 | Asada et al. | 117/227 |
| 4,065,743 | 12/1977 | Wahlers et al. | 338/308 |
| 4,130,671 | 12/1978 | Nagesh et al. | 427/125 |
| 4,215,020 | 7/1980 | Wahlers et al. | 252/519 |
| 4,378,409 | 3/1983 | Wahlers et al. | 428/432 |
| 4,381,198 | 4/1983 | Kondo et al. | 106/1.27 X |
| 4,397,915 | 8/1983 | Wahlers et al. | 428/432 |
| 4,536,328 | 8/1985 | Hankey | 252/519 X |
| 4,539,223 | 9/1985 | Hormadaly | 252/519 X |
| 4,548,742 | 10/1985 | Hormadaly | 106/1.27 X |
| 4,554,094 | 11/1985 | Bäbler et al. | 252/519 X |

FOREIGN PATENT DOCUMENTS 812858 3/1957 United Kingdom .
1511601 5/1978 United Kingdom .

OTHER PUBLICATIONS

"Electrical Applications of Thin-Films Produced by Metallo-Organic Deposition," C. Y. Kuo, Solid State Technology, Feb. 1974.

Primary Examiner—Nancy A. Swisher
Attorney, Agent, or Firm—Rodger H. Flagg

[57] ABSTRACT

A pre-reacted resistor paint is disclosed, wherein a base metal powder, such as $SnO_2$ is coated with a resinate solution, such as Co and Mn resinates and fired in a reducing atmosphere to form a pre-reacted conductive powder for subsequent mixing with a glass frit and a screening agent to blend a pre-reacted resistive paint, for subsequent screening onto a substrate and firing in an inert atmosphere to form a base metal resistor therefrom. Two mixtures of resistive paint are disclosed. The first resistive paint exhibiting a sheet resistivity in the range from 5,000 through 20,000 ohms per square; and the second resistive paint exhibiting a sheet resistivity in the range from 50,000 through 300,000 ohms per square. The first and second resistive paints may be blended to provide a base metal resistive paint exhibiting a sheet resistivity in the range from 5,000 through 300,000 ohms per square, with a TCR within ±200 ppm/°C.

13 Claims, 14 Drawing Figures

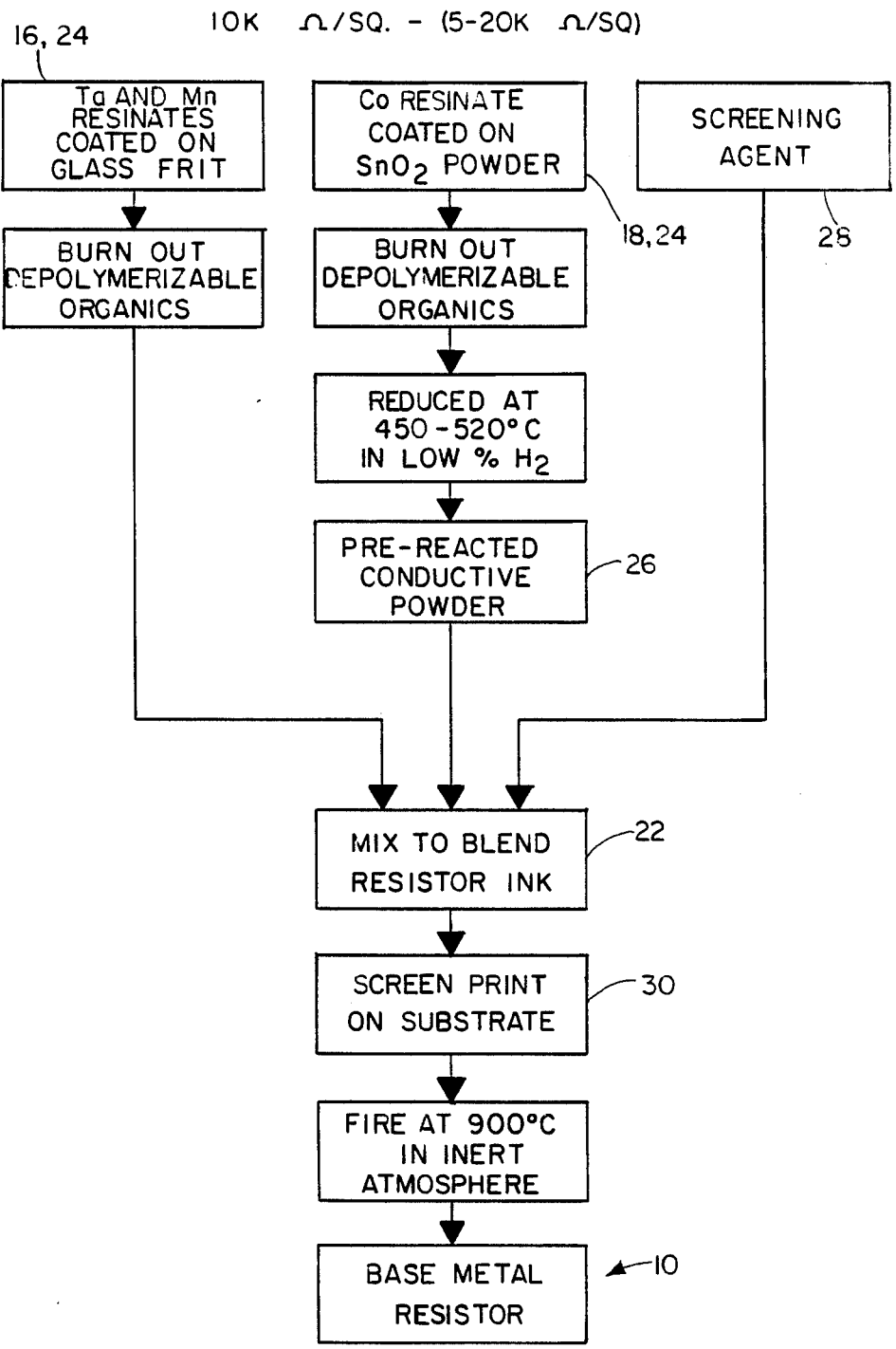

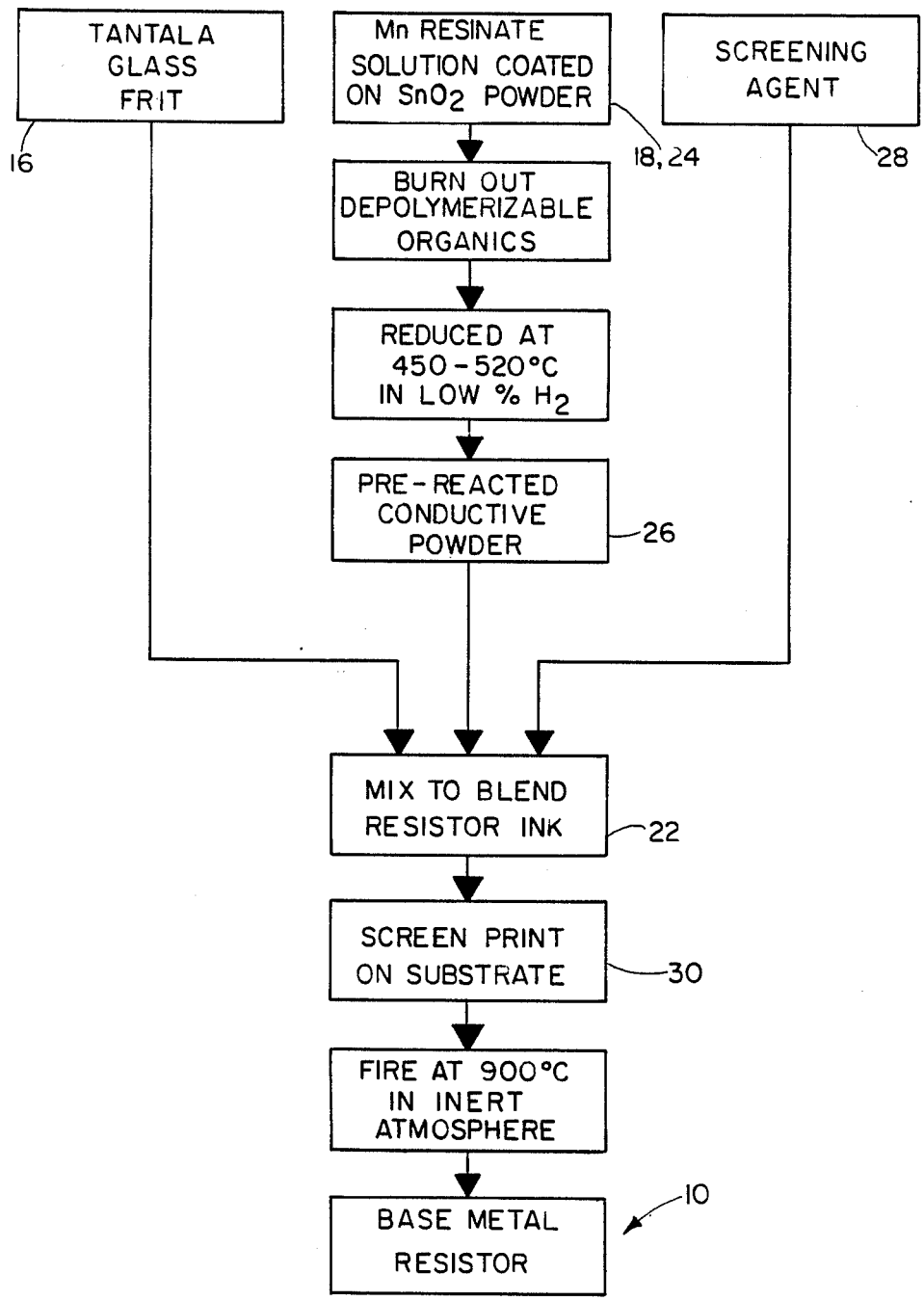

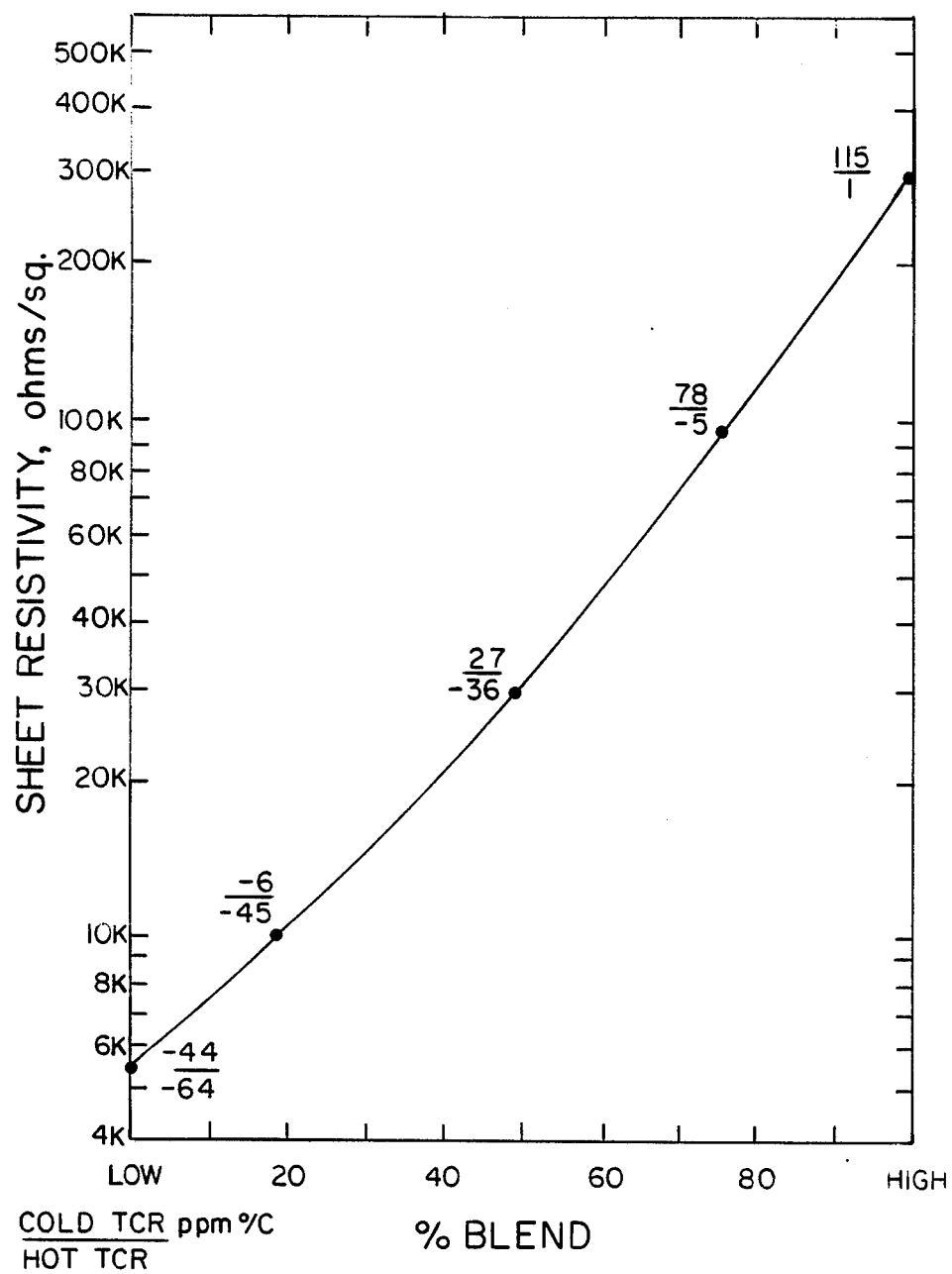

Ω/□ VS FIRING TEMPERATURE

FIRING TEMPERATURE °C

TCR VS FIRING TEMPERATURE

FIRING TEMPERATURE °C

Ω/□ VS FIRING TIME
900°C

TOTAL FIRING TIME (MIN.)

TCR VS FIRING TIME
900°C

TOTAL FIRING TIME (MIN.)

Ω/□ VS NO. OF FIRING

900°C

TCR VS NO. OF FIRING

900°C

Ω/□ VS BELT SPEED (INFRARED FIRING, 900°C, $N_2$)

TCR VS BELT SPEED (INFRARED FIRING, 900°C, $N_2$)

PRE-REACTED RESISTOR PAINT, AND RESISTORS MADE THEREFROM

TECHNICAL FIELD

The present invention relates to base metal resistive paint, resistors made from the resistive paint, and methods for making the resistive paint. More particularly, this invention relates to coating a base metal powder with a resinate solution and firing in a reducing atmosphere to form a pre-reacted conductive powder for mixing with a glass frit and a screening agent to blend a resistive paint, for subsequent screening onto a substrate and firing in an inert atmosphere to form a base metal resistor therefrom. Two mixtures of resistive paint are disclosed. These mixtures may be controllably blended to provide a controlled sheet resistivity from 5,000 to 300,000 ohms/sq. with a TCR within ±200 ppm/°C.

BACKGROUND ART

The principal component in first generation thick film resistor systems was palladium oxide powder. Second generation thick film resistor systems used ruthenium oxide powder. Noble metal resistor paints require noble metal conductors for making microcircuits. The recent increase in the cost of precious metals has made their use prohibitive for many applications. Tin oxide compounds have been used as a major conductive material in resistors for many years. Tin oxide films may be processed by spraying and heating a tin chloride solution; by evaporation or sputtering technology; by chemical vapor deposition; or by thick film technology.

Thick film technology has been used in the electronics industry for more than 25 years. Thick film technology includes printing and firing a resistive paint in a desired pattern upon a suitable substrate. Resistive paints used in thick film technology typically include a conductive or resistive material, a glass frit, and a screening agent. A base metal resistive paint is a resistive paint that has no noble metals included in its composition.

Various materials have been admixed with tin oxide powder to obtain a wide range of resistivity.

Metallo-organics are homogenous solutions in which a metal is linked to an oxygen, a sulfur or a nitrogen atom, which in turn is attached to one or more carbon atoms.

Examples are:

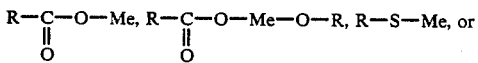

where "R" represents an aromatic or aliphatic group. A metallo-organic compound may be called a metal resinate, where the organic portion is derived from resins or other natural compounds. Firing a metal resinate at high temperature will burn out the organic portion to form a metal or metal oxide having atomic or molecular form. A precious metal resinate will yield a metal when fitted in air. A base metal resinate will yield a metal only when fired in an inert or reducing atmosphere. Metallo-organic conductors and resistors have been used for many years, but their use was previously limited to use with precious metals.

Current thick film technology should meet stringent test requirements; exhibit several decades of sheet resistivity; control TCR to within ±200 ppm/°C.; and be capable of being fired at a uniform temperature to be commercially acceptable. The higher the firing temperature, the more energy and expense is expended to make the resistor. Therefore, it is advantageous to disclose a resistive paint capable of firing at less than 1,000° C. The resistive paint of the current invention is preferably fired at 900° C.±20° C.

KNOWN PRIOR ART

U.S. Pat. No. 3,598,761 teaches the coating of an alumina powder with a palladium resinate and coating a copper powder with a gold resinate.

U.S. Pat. No. 4,130,671 discloses coating a nickel or glass powder with a silver resinate.

U.S. Pat. No. 3,776,772 describes coating ruthenium oxide particles with niobium solution to obtain improved noise levels.

U.S. Pat. No. 4,215,020 shows ternary conductive materials used with tin oxide resistors.

British Patent. No. 812,858 teaches semi-conducting $SnO_2$ and $Ta_2O_5$ glazes.

An article in Solid State Technology in February, 1974 discloses "Electrical Applications of Thin Films produced by Metallo-Organic Deposition" by C. Y. Kuo.

An article on "Microstructure Development and Interface Studies in Base-Precious Metal Composition Thick Film Conductors" by V. K. Nagesh and Joseph A. Pask in Solid State Technology, pp. 4A7-1, 4A7-8- 1984.

British Patent. No. 1,511,601 discloses a resistor composition of tin oxide and tantalum oxide.

U.S. Pat. No. 4,065,743 teaches a mixture of $SnO_2$ and $Ta_2O_5$,

U.S. Pats. Nos. 4,397,915 and 4,378,409 disclose using a tin oxide material with a barium oxide glass frit.

DISCLOSURE OF THE INVENTION

While $SnO_2$ powder has been used by admixture as a conductive powder, the present invention discloses coating a base metal powder, such as $SnO_2$ powder with a Mn or Co resinate solution and firing the resinate coated base metal powder in a reducing atmosphere at 450°-520° C. to form a pre-reacted resinate coated conductive powder. By mixing the pre-reacted conductive powder with a glass frit and a screening agent, a resistive paint or ink is mixed, exhibiting improved controllability of sheet resistivity and TCR over a range from 5,000 to 300,000 ohms per square.

A first pre-reacted resinate coated $SnO_2$ conductive powder is disclosed, coated with a Co resinate solution; and a glass frit coated with at least one resinate solution selected from Ta and Mn resinates, prior to mixing the resinate coated glass frit; the pre-reacted resinate coated $SnO_2$; and the screening agent, to form a first base metal resistive paint having a controlled sheet resistance from 5,000 to 20,000 ohms per square.

A second pre-reacted resinate coated $SnO_2$ conductive powder is also disclosed, coated with an Mn resinate solution and fired in a reducing atmosphere at 450°-520° C. to form a pre-reacted resinate coated $SnO_2$ conductive powder, which is mixed with a tantala glass frit and a screening agent to form a second base metal resistive paint or ink having a controlled sheet resistance from 50,000 to 300,000 ohms per square.

The disclosed first and second resistive paints may be blended to form a resistive paint having a controlled sheet resistivity selected from a range from 5,000 to 300,000 ohms per square. Over the entire range, TCR is held within ±200 ppm/°C.

Therefore, what is needed is an inexpensive base metal resistor paint, exhibiting a controlled sheet resisitivity and a TCR within ±200 ppm/°C.

One object of this invention is to provide an improved base metal resistive paint suitable for firing on a substrate to form a resistor thereon.

Another object is to provide a resistive paint mixed from a pre-reacted conductive powder; a glass frit and a screening agent.

Yet another object is to blend a first resistive paint exhibiting a sheet resistivity in a range from five thousand to twenty thousand ohms per square; with a second resistive paint exhibiting a sheet resistivity in the range from 50,000 to 300,000 ohms per square to proportionately blend a resistive paint exhibiting a controlled sheet resistance selected from a range from 5,000 to 300,000 ohms per square.

Still another object is to coat the glass frit powder with at least one resinate solution selected from Ta and Mn resinates prior to mixing the glass frit with the pre-reacted conductive powder and the screening agent.

Another object is to preheat the pre-reacted conductive powder by firing in a reducing atmosphere at 450°-520° C. prior to mixing the pre-reacted conductive power with the glass frit and the screening agent.

Yet another object is to burn off the depolymerizable organics coated upon the pre-reacted conductive powder prior to firing.

Still another object is to coat $SnO_2$ powder with at least one resinate solution selected from Co and Mn resinates prior to mixing with the glass frit and the screening agent.

Still another object is to provide an improved resistor made from a resistive paint embodying any combination of the objects previously disclosed.

The above mentioned and other features and objects of this invention and the manner of attaining them will be best understood by reference to the following description of an embodiment of the invention, when considered in conjunction with the accompanying drawings.

BRIEF DESCRIPTION OF THE DRAWINGS

FIG. 2 shows a flow chart of the preferred first base metal resistive paint having a controlled sheet resistivity from 5,000 to 20,000 ohms per square.

FIG. 3 shows a flow chart of the preferred second base metal resistive paint having a controlled sheet resistivity from 50,000 to 300,000 ohms per square.

FIG. 4 shows a blend curve for blending first and second base metal resistive paints to develop a controlled sheet resistivity from 5,000 to 300,000 ohms per square.

BEST MODE FOR CARRYING OUT THE INVENTION

Figure 1A:
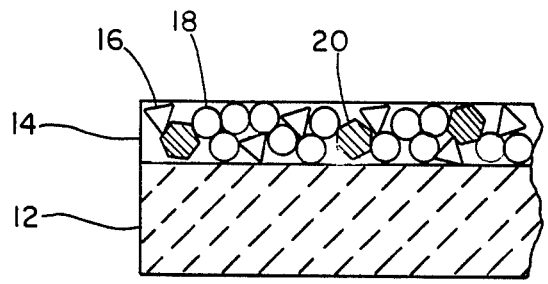
FIG. 1A shows an enlarged cross-sectional view of an admixture of glass frit, doped material and conductive powder screened upon a substrate prior to firing as taught by the prior art.

The subject matter which I regard as my invention is particularly pointed out and distinctly claimed in the claims. The structure and operation of my invention, together with further objects and advantages, may be better understood from the following description given in connection with the accompanying drawings, in which:

FIG. 1A shows an enlarged cross-sectional view of a substrate 12, with an admixture of resistive paint 14 prior to firing, including a glass frit 16; a base metal powder 18; and powdered doped material 20, as utilized in the known prior art.

Figure 1B:
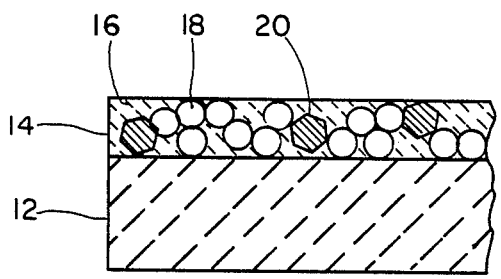
FIG. 1B shows an enlarged cross-sectional view of the admixture of glass frit, doped material and conductive powder screening upon a substrate after firing as taught by the prior art.

FIG. 1B shows an enlarged cross-sectional view of the admixture of FIG. 1 after mixing, wherein the resistive paint 14 has been fired to melt the glass frit 16 to form a resistive paint upon substrate 12, as utilized in the known prior art. Note that the dispersion of doped materials 20 to base metal powder 18 is not greatly affected by firing, thus the resistance is not uniform throughout the fired resistive paint.

Figure 1C:
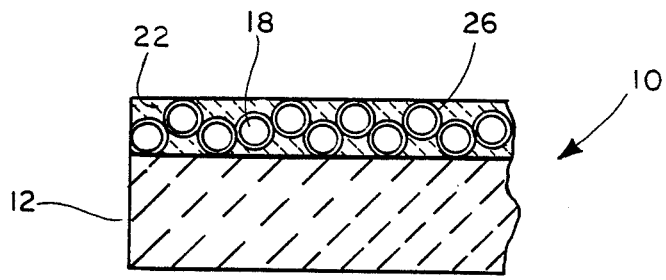
FIG. 1C shows an enlarged cross-sectional view of the pre-reacted resinate coated $SnO_2$ conductive powder screened upon a substrate after firing as taught by the present invention.

FIG. 1C shows an enlarged cross sectional view of the pre-reacted resistor paint 22 of the present invention, after firing. The uniform coating of a resinate solution 24 upon the base metal powder 18 provides uniform consistency throughout the pre-reacted resistive paint 22, providing improved performance characteristics, such as controlled sheet resistivity, lower TCR, uniformity of coefficient of variance (C.V.) and improved noise level.

In the present invention, all compositions are given by weight percentage. The preferred pre-reacted resistive paint 22 is made by coating a base metal conductive powder 18, such as $SnO_2$, with a resinate solution 24 selected from at least one resinate from Co and Mn resinates; firing the resinate coated conductive powder in a reducing atmosphere at 450°-520° C. to form a pre-reacted conductive powder 26; mixing the pre-reacted conductive powder 26 with a glass frit 16 and a screening agent 28 to form a pre-reacted resistive paint 22 for subsequent screening onto a substrate 12, and firing the screened substrate 30 at 900° C. in an inert atmosphere to form a base metal resistor 10 therefrom.

The dried resinate coated base metal powder 26, glass frit 16 and screening agent 28 are preferably processed through a three roll mill to yield a consistent paint for easy screening, with a preferred uniform particle size of less than 10 microns. The screening agent 28 is preferably a solvent, such as pine oil, terpinel, an ester alcohol of Texanol from Texas Eastman Co., butyl carbitol acetate, or the like.

The resins used for binders are preferably polyalkylmethancrylate from DuPont or Rohm and Haas, or polybutenes, such as Amoco H-25, Amoco H-50 or Amoco L-100 from Amoco Chemicals Corporation. A wetting agent is sometimes added to the screening agent 28 to aid in wetting the conductive powder 18 for improved paint rheology.

The mixed resistor paint 22 is subsequently screened upon a substrate 12 prior to firing, to form a designated resistor pattern on a substrate 12, such as a ceramic substrate. The resistive paint 22 is preferably screened through a 200 mesh stainless steel screen with 0.5 mil emulsion.

Copper conductors on the substrate were prefired at 900° C.±20° C. in a nitrogen atmosphere. The screened resistor paint 22 was dried at 100°-125° C. in air for 15-30 minutes. The dried resistor paint 22 was then fired in a belt furnace at 900° C.±20° C. peak temperature for approximately 3-10 minutes in an inert atmosphere. The oxygen content in the belt furnace was less than 15 ppm.

The metal content in the resinate solution 24 is preferably less than 30%. The Ta in tantalum resinate is preferably from 6 to 11%. The Mn in manganese resinate is preferably from 7 to 12%; and the Co in colbalt resinate is preferably from 10–15%.

The pre-reacted conductive powders 26 were processed by the following steps:
(a) dilute the resinate solution 24 in a low boiling point solvent, such as acetone, xylene or benzene to form a homogenous solution;
(b) add the homogenous solution to base metal conductive powder 18 in sufficient quantity to cover the conductive powder;
(c) dry the resinate coated powder at a temperature sufficient to burn off the depolymerizable organics, at a temperature from 300° C. to 550° C.;
(d) grind and sift the dried resinate coated powder to a particle size of less than 10 microns; and
(e) fire the dried resinate coated powder in a reducing atmosphere at 450°-520° C. for sufficient time to make an oxygen deficient semiconductor. In the following examples the equipment used for reducing the coated conductive powder was a tube furnace with a quartz or metal tube. The reducing gas was a low percentage hydrogen mixture, such as 7%$H_2$/93% $N_2$. A boat or a rotational tube with a screw type or belt advancement may also be used for automatic processing. A continuous process, such as a rotational tube will yield more consistent results than obtainable from a stationary boat setup.

Two pre-reacted resistor paints are disclosed. FIG. 2 shows a flow chart for a first base metal resistor paint having a sheet resistivity of 5,000 to 20,000 ohms per square. FIG. 3 shows a flow chart for a second base metal resistor paint having a sheet resistivity of 50,000 to 300,000 ohms per square. FIG. 4 shows a blend curve for mixing the first and second resistive paints of FIGS. 2 and 3, to obtain a pre-reacted base metal resistor paint selected from a range of 5,000 to 300,000 ohms per square, having a TCR within ±200 ppm/°C.

Referring now to FIG. 2, the first pre-reacted resistor paint comprises a glass frit powder 16 coated with a resinate solution 24 selected from at least one of Ta and Mn resinates. Any depolymerizable organics present in the resinate coated glass frit are then burned out to obtain the preferred resinate coated glass frit 32 of the first pre-reacted resistor paint.

A base metal conductive powder 18, such as $SnO_2$ powder, is coated with a Co resinate solution 24, and any depolymerizable organics present in the resinate coated conductive powder 18 are then burned out to obtain the preferred resinate conductive powder. The resinate coated conductive powder is then fired in a reducing atmosphere, preferably at 450°-520° C., to produce the pre-reacted conductive powder 26 of the first resistor paint herein disclosed.

The resinate coated glass frit 32, and the pre-reacted conductive powder 26 are mixed with a screening agent 28 to blend the first resistor ink disclosed in FIG. 2, which exhibits a controlled sheet resistivity of from 5,000 to 20,000 ohms per square.

As disclosed in the flow chart in FIG. 3, the second pre-reacted resistor paint comprises mixing a tantala galss frit, a pre-reacted conductive powder, and a screening agent.

The pre-reacted conductive powder of the second resistor paint is made by coating a base metal conductive powder, such as $SnO_2$ with a Mn resinate solution. Any depolymerizable organics present in the resinate coated conductive powder is then burned out to obtain the preferred resinable coated conductive powder of the second resistor paint. The resinate coated conductive powder is then fired in a reducing atmosphere, preferably 450°-520° C., to produce the pre-reacted conductive powder of the second pre-reacted resistor paint, which exhibits a controlled sheet resistivity of from 50,000 to 300,000 ohms per square.

The first pre-reacted resistive paint of FIG. 2 may be blended with the second pre-reacted resistive paint of FIG. 3 as shown in FIG. 4, to produce a pre-reacted resistor paint having a controlled sheet resistivity selected from a range of 5,000 to 300,000 ohms per square.

The blended first and second pre-reacted resistor paints may subsequently be screened upon a substrate in the desired resistor pattern, and fired at a peak temperature of 900° C.±20° C. in an inert atmosphere to obtain the desired base metal resistor. As shown in FIG. 4, the hot and cold temperature coefficient of resistance (TCR) are held within ±200 ppm/°C. throughout the entire range of sheet resistivity from 5,000 to 300,000 ohms per square.

In the following examples, Cold TCR (CTCR) was tested at −55° C. to +25° C., Hot TCR (HTCR) was tested at +25° C. to +125° C., thermal stability was tested at 150° C. for 48 hours, short time overload (STOL) was tested at 500 volts or 5 watts maximum, and the resistor size tested was 0.062×0.156 inches, or 2.5 squares.

In the first pre-reacted resistor paint of FIG. 2, the composition of the glass frit "A" preferably comprises 5% $SiO_2$, 35% $SrO$ and 60% $B_2O_3$.

In the second pre-reacted resistor paint of FIG. 3, the tantala glass frit "B" preferably comprises 99.6% of the glass frit "A" of the first pre-reacted resistor paint coated with 0.4% of the tantalum resinate solution. The tantalum resinate coated glass frit was gradually dried in air at temperatures up to 600° C. for a few hours.

The resinate coated base metal conductive powders were reduced in 7%$H_2$/93% $N_2$ atmosphere at 520° C. for 30 minutes. The ratio of base metal conductive powder to glass frit in both first and second pre-reacted resistor paints was 3.5 to 1.

Copper conductive were pre-fired onto the substrate at 900° C. in a nitrogen atmosphere with an oxygen content of less than 15 ppm. The resistor paint was screened onto the substrate overlapping the copper conductors through a 200 mesh stainless screen with a 0.5 mil emulsion.

The wet film thickness of the blended pre-reacted resistor paint was 40 to 50 microns. Printed resistors were air dried at 100° C. for 15 minutes, prior to firing at 900° C.±20° C. in an inert atmosphere having an oxygen content less that 15 ppm.

Table I shows a comparison of the first glass frit "A" (Example 1) with the second Ta resinate coated glass frit "B of FIG. 2."

TABLE I

| Glass Frit | Sheet Resistance Ohms/Sq. | TCR, ppm/°C. | |
|---|---|---|---|
| | | HTCR | CTCR |
| Uncoated Example 1 | 28,000 | −1770 | −4550 |
| 0.4% Ta Coated Example 2 | 8,800 | −174 | −209 |

As shown in Table I, the 0.4% Ta resinate coated glass frit "B" of Example 2 dramatically improved the TCR by a factor of more than 10 times over glass frit "A" (Example 1).

By comparison, Table II shows the effects of admixture of $Ta_2O_5$ powder to the glass frit "A", to obtain similar results on TCR properties.

TABLE II

| $Ta_2O_5$ Added | Sheet Resistance Ohms/Sq. | TCR, ppm/°C. | |
|---|---|---|---|
| | | HTCR | CTCR |
| Example 3 (8.2%) | 37,000 | −403 | −328 |
| Example 4 (11.6%) | 27,000 | −229 | −199 |
| Example 5 (15%) | 96,000 | −188 | −238 |

The quantity of $Ta_2O_5$ needed for admixture is at least 11 to 15%, whereas the Ta resinated coated glass of Example 2 required only 0.5% to obtain similar results.

The cost of tantalum is much higher than the cost of most non-noble metals, and tantalum costs are even higher than some precious metals, such as silver. Therefore, the savings of Ta resinate coating shown in example 2 are significant. The molecular resinate coating on glass powder acts to reduce the current noise level and improves the uniformity of the pre-reacted resistor paint made therefrom.

As shown in Table III, in Examples 6-10, the base metal conductive powder is coated with varying amounts of Mn resinate solution, and the coated resinate conductive powders were fired in a reducing atmosphere as previously disclosed. 80% glass frit "A" was mixed with 20% $Ta_2O_5$ to make glass frit "C". The mixture was remelted at 1200° C., and ball milled. Glass frit "C" was then mixed with the pre-reacted conductive powder in a ratio of 3.5 to 1, and blended with a screening agent to make the resistor paints of Examples 6 though 10.

TABLE III

Pre-Reacted Mn Resinate Coated $SnO_2$ Resistors

| | % Mn Resinate | Sheet Resistance Ohms/Sq. | TCR, ppm/°C. | | STOL % | Thermal Stability |
|---|---|---|---|---|---|---|
| | | | HTCR | CTCR | | |
| Example 6 | .085% | 132,000 | 120 | −16 | 0.02 | 0.20% |
| Example 7 | 1.7% | 257,000 | 130 | 17 | 0.12 | 0.05% |
| Example 8 | 2.5% | 285,000 | 115 | 1 | 0.09 | 0 |
| Example 9 | 4.3% | 429,000 | 82 | −76 | −0.36 | 0.06% |
| Example 10 | 8.5% | 330,000 | 129 | −28 | 0 | 0.11% |

The 1.7% Mn resinate coated $SnO_2$ resistors of Example 7 were tested under different temperatures and various reducing conditions, under more than 20 testing conditions, and the sheet resistance remained within 100,000 to 300,000 ohms/square, and the TCR's within ±200 ppm/°C.

The low sheet resistivity pre-reacted resistor paints were made as disclosed in FIG. 2. For comparison, two glass frits were used in Examples 10 through 13 in Table IV.

Glass frit "A" comprising 5% $SiO_2$, 35% SrO and 60% $B_2O_3$ was coated with 4% tantalum and 1.7% maganese resinate solutions, and air dried at 450°–600° C. to burn out the depolymerizable organics, to make glass frit "E" in Table IV.

Glass frit "D" comprising 6.5% $SiO_2$, 41% BaO, 40% $B_2O_3$ and 3.5% CuO was coated with 4% tantalum and 1.7% manganese resinate solutions, and air dried at 450°–600° C. to burn out the depolymerizable organics to make glass frit "F" in Table IV.

The pre-reacted conductive powder and the pre-reacted glass frit were mixed in a ratio of 3.5 to 1 and blended with a screening agent, to make the pre-heated resistive paint. The combined mixture was blended in a three roll mill to blend the resistor paint used in Examples 10 through 13. The resistor paint was screened on an alumina substrate and fired at 900° C.±20° C. in an inert atmosphere to obtain the following results:

TABLE IV

| | % of Co Resinate | Glass Frit | Kohms/Sq. | TCR, ppm/°C. | | Thermal Stability | STOL |
|---|---|---|---|---|---|---|---|
| | | | | HTCR | CTCR | | |
| Example 10 | 0.8 | E | 5.4 | −44 | −64 | 0.1 | 0.015 |
| Example 11 | 0.8 | F | 4 | −39 | −100 | 0.1 | 0.06 |
| Example 12 | 1.6 | E | 6.8 | −132 | −149 | 0.06 | −0.02 |
| Example 13 | 1.6 | F | 11 | −9 | −85 | 0.02 | −0.02 |

More than 25 samples of Examples 10 through 13 were tested under various conditions. The fired resistors yielded a sheet resistivity from 4 to 15 kohms/square and a TCR within ±200 ppm/°C. Thermal stability and STOL were excellent.

The blendability of resistor paint is an important feature of thick film technology. Blendability enables adjacent decade inks or paints to be blended to yield predictable properties. The blend curve of FIG. 4 shows that the 5,000 to 20,000 ohms per square resistive paint of FIG. 2 may be blended with the 50,000 to 300,000 ohms per square resistive paint of FIG. 3 to yield a nearly straight line blend. HTCR and CTCR are shown along the curve. A combined TCR within the range of ±200 ppm/°C. is readily obtained. Careful control of the resistive paint process can yield a combinated TCR within ±100 ppm/°C.

Figure 5A:
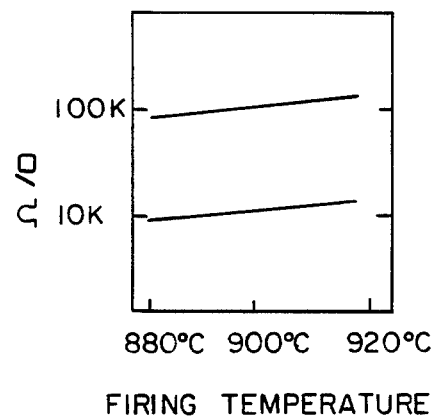
FIG. 5A shows the effect of firing temperature on sheet resistivity in ohms per square.
Figure 5B:
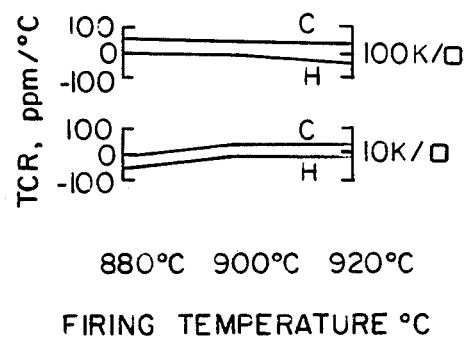
FIG. 5B shows the effect of firing temperature on TCR.

Resistor properties should be insensitive to variations in processing conditions, such as firing temperatures, firing times, and number of firings. FIG. 5A shows the effect of firing temperature on sheet resistivity in ohms per square on 10K and 100K resistors. FIG. 5B shows the effect of firing temperature on TCR. Sheet resistivity changes are within ±10% and TCR within ±100 ppm/°C., in the examples noted.

Figure 6A:
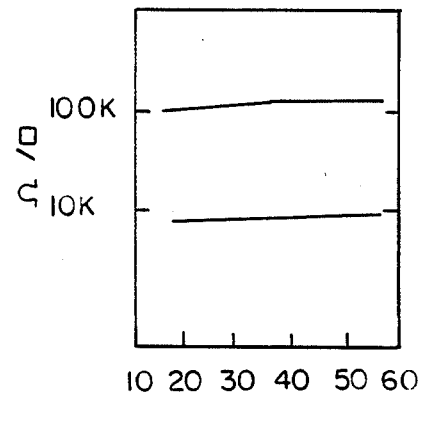
FIG. 6A shows the effect of firing time at 900° C. on sheet resistivity in ohms per square.
Figure 6B:
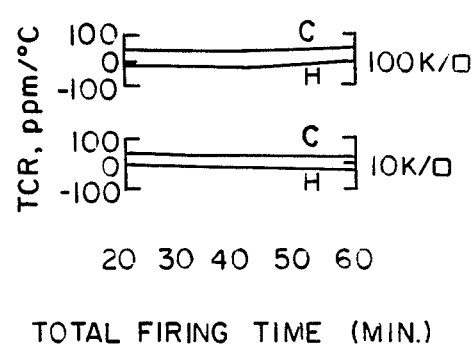
FIG. 6B shows the effect of total firing time at 900° C. on TCR.

FIG. 6A shows the effect of firing time on sheet resistivity in ohms per square. Both 10K and 100K ohms per square resistors are within ±10%. FIG. 6B shows the effect of total firing time on TCR. For both 10K and 100K ohms per square resistors, the TCR remains within ±100 ppm/°C.

Figure 7A:
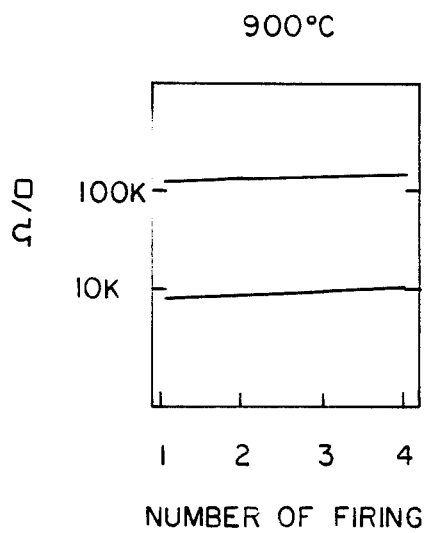
FIG. 7A shows the effect of a number of firings at 900° C. on sheet resistivity in ohms per square.
Figure 7B:
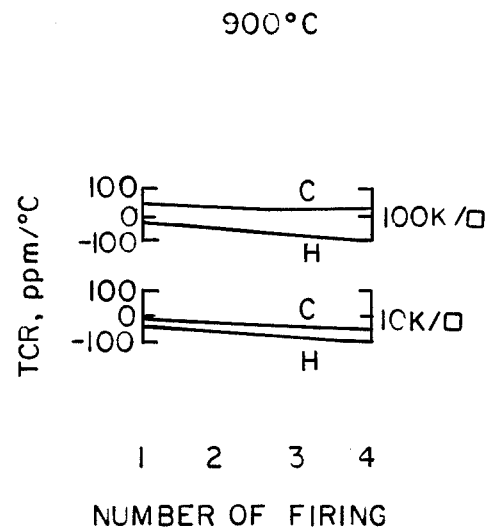
FIG. 7B shows the effect of a number of firings at 900° C. on TCR.

FIGS. 7A and 7B show the effect of the number of firings on ohms per square and TCR. If peak temperatures are kept at 900° C. in an inert atmosphere, the sheet resistivity remains within ±10%, and the TCR within ±100 ppm/°C., after four (4) firings.

Figure 8A:
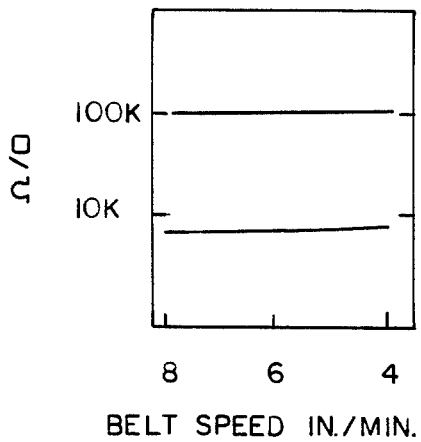
FIG. 8A shows the effect of belt speed in inches per minute on sheet resistivity in ohms per square.
Figure 8B:
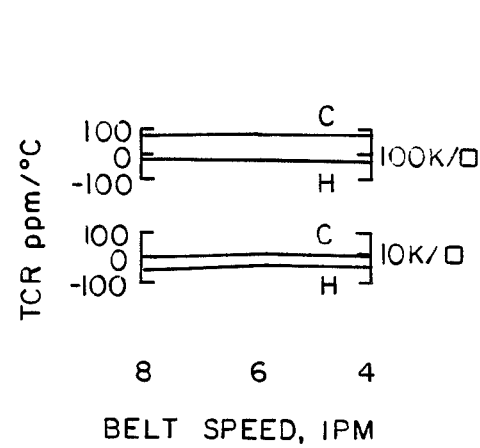
FIG. 8B shows the effect of belt speed in inches per minute on TCR.

FIGS. 8A and 8B show the effect of belt speed in inches per minute on sheet resistivity in ohms per square and TCR in ppm/°C. Both 10K and 100K resistors fall within ±10% sheet resistivity, and within ±100 ppm TCR.

Thick film resistor technology has recently used infrared furnaces to benefit from energy savings, rapid heating and cooling times, increased output rate, and space savings. Infrared furnaces are easy to repair and are cost competitive with conventional furnaces.

However, some noble metal thick film resistor paints yield markedly different results when fired in an infrared furnace as compared to a conventional furnace. FIGS. 8A and 8B show the results of the resistors made from the pre-reacted resistive paints of the present invention, when fired at 900° C.±20° C. in an infrared furnace. Belt speeds were set at 4, 6 and 8 inches per minute, for a total furnace time of 36, 24 and 18 minutes respectively. The total heating zone was five feet long, and the cooling zone was seven feet long. 900° C. temperature was set in the middle two zones in a 4-zone IR furnace, in an inert atmosphere having an oxygen content of less that 15 ppm.

Change in sheet resistivity was less than ±10%, and the TCR's remained within ±100 ppm/°C.

Thus, it is established that the pre-reacted base metal resistor paints of the present invention are relatively insensitive to processing conditions, and the results are comparable with ruthenium-based resistor systems.

Another important feature of resistor paints made by the disclosed process is the low current noise inherent in resistors made from the disclosed pre-reacted resistor paints. Base metal resistors generally create more current noise than precious metal resistors. Current noise is strongly dependent on the dimension of the resistor.

However, the inventor has introduced a noise constant which is independent of the geometry of the resistor, and represents a noise index value of a resistor material of unit volume (dB/mil$^3$ or dB/mm$^3$). Noise constant equals noise index + 10 log volume. The more negative dB means less noise from the resistor.

The noise constant of a 100 kohms/sq. resistor of the present invention average 20 dB per mil$^3$, as compared to 55 dB per mil$^3$ for palladium resistors and 40 dB per mil$^3$ for ruthenium-based resistor systems.

Another important feature of resistors made by the present invention is laser trimability. Resistors made by the present invention were laser-trimmed with a Chicago Laser Model CLS 33 50C Yag laser. The trimming parameters were 0.75" to 1.25" per second trim speed, Q-rate 4 Khz pulse frequency, and 3-watt beam power. The increase in sheet resistances was 20–40%. The resistance changes after trimming were less than 0.2% from 10K to 100K ohms per square sheet resistivity, which is comparable with ruthenium based resistors.

The short time overload was run with 2.5 times rated voltage or 5 watts for 5 seconds, but not over 500 volts. Test results show the resistance change after STOL is generally less than 0.25% which meets most stringent applications.

Environmental tests were run after resistor samples were fired, laser-trimmed, organic overcoated, and soldered. The following test results were based on 100K ohms/sq. pre-reacted resistive paint.

Table V shows thermal stability at 150° C. for 1,000 hours. A change of less than ½% was noted.

TABLE V

| Time/Hr. | 100K Ohms/Sq. |
|---|---|
| 24 | 0.05% |
| 46 | 0.11% |
| 168 | 0.24% |
| 500 | 0.39% |
| 1,000 | 0.48% |

Storage humidity was run at 65°–70° C. and 85°–95% RH up to 1,000 hours. The storage humidity for 100K resistors made by the present invention changed less than 0.2% in 1,000 hours Reference Table VI.

TABLE VI

| Time/Hr. | 100K Ohms/Sq. |
|---|---|
| 168 | 0.06% |
| 500 | 0.10% |
| 1,000 | 0.12% |

Load humidity was tested at 10% rated wattage at 65°–70° C., 95% RH. After 1,000 hours, the load humidity for 100K resistors made by the present invention changed less than 0.2%. Reference Table VII.

TABLE VII

| Time/Hr. | 100K Ohms/Sq. |
|---|---|
| 168 | 0.08% |
| 500 | 0.14% |
| 1,000 | 0.17% |

The temperature cycle was tested from −65° to 150° C. for 100 cycles. Average resistance change for 100K resistors made by the present invention after 100 cycles was less than 0.1%.

The disclosed pre-reacted base metal resistor paints are suitable for use with high reliability, thick film resistor applications. The disclosed resistor paints may be blended to acheive a broad range of sheet resistivity from 5,000 to 300,000 ohms per square, with a TCR within ±200 ppm/°C.

Therefore, while this invention has been described with reference to a particular embodiment, it is to be understood that modifications may be made without departing from the spirit of the invention, or from the scope of the following claims.

INDUSTRIAL APPLICABILITY

This invention discloses a base metal resistive paint for subsequent screening upon a substrate and firing in an inert atmosphere to make a pre-reacted base metal resistor for use with electronic circuitry.

I claim:

1. A first base metal, printable thick film resistive composition, which comprises:
   a tin oxide powder coated with a resinate solution having 10% to 15% Cobalt therein, the resinate coated tin oxide powder prefired in air to burn out depolymerizable organics therefrom, then reduced in a reducing atmosphere to form a Cobalt pre-reacted tin oxide powder therefrom;
   a borosilicate glass frit powder coated with a resinate solution having 6% to 12% selected from at least one of Tantalum and Manganese to form a resinate coated glass frit; and
   the Cobalt pre-reacted tin oxide powder and the resinate coated glass frit are well mixed with a screening agent to form the first base metal resistor composition having a sheet resistivity in a range from 5,000 to 20,000 ohms per square when screened upon a substrate and fired in an inert atmosphere to form a base metal resistor therefrom.

2. The first composition of claim 1 wherein the glass frit preferably comprises 5% $SiO_2$; 35% SrO; and 60% $B_2O_3$.

3. The first composition of claim 1, wherein the resinate coated tin oxide powder is prefired in a reducing atmosphere at a peak temperature of 450° to 520° C.

4. The first composition of claim 1, wherein the preferred ratio of Colbalt pre-reacted tin oxide powder to resinate coated glass frit is three and one half to one.

5. The first composition of claim 1, wherein the TCR of resistors made therefrom is within ±200 ppm/°C.

6. The first composition of claim 1 and the second composition of claim 2 wherein the second composition is blended with the first composition to proportionately increase the sheet resistivity; and the first composition is blended with the second composition to proportionately decrease the sheet resistivity to a controlled sheet resistivity selected from the range of 5,000 to 300,000 ohms per square, when screened on a substrate and fired in an inert atmosphere to form a base metal resistor therefrom.

7. A second base metal, printable, thick film resistor composition, which comprises:
   a tin oxide powder coated with 7% to 12% Manganese resinate solution prefired in air to burn out depolymerizable organics therefrom, then reduced in a reducing atmosphere to form a Manganese pre-reacted tin oxide powder therefrom;
   the Manganese pre-reacted tin oxide powder is then well mixed with a tantala glass frit and a screening agent to form the second base metal resistor composition having a sheet resistivity in the range from 50,000 to 300,000 ohms per square when screened upon a substrate and fired in an inert atmosphere to form a base metal resistor therefrom.

8. The second composition of claim 7, wherein the tantala glass frit comprises a glass frit blended with from 5% to about 20% $Ta_2O_5$, remelted and reground to form the tantala glass frit.

9. The second composition of claim 7, wherein the Manganese resinate coated tin oxide powder is prefired in a reducing atmosphere at a peak temperature of 450° to 520° C.

10. The second composition of claim 7, wherein depolymerizable organics are burned out of the Manganese resinate solution coated on the powder during pre-firing.

11. The second composition of claim 7, wherein the preferred ratio of Manganese pre-reacted tin oxide powder to glass frit is preferably three and one half to one.

12. The second composition of claim 7, wherein the TCR of resistors made therefrom is within ±200 ppm/°C.

13. The second composition of claim 7, wherein the tantala glass frit preferably comprises: 5% $SiO_2$; 35% SrO; and 60% $B_2O_3$ mixed with 5 to 20% $Ta_2O_5$, remelted and reground to form the tantala glass frit.

* * * * *